March 15, 1966 E. A. SANDS 3,240,999

ELECTRIC CIRCUIT CONSTRUCTION

Filed Oct. 8, 1962 2 Sheets-Sheet 1

INVENTOR

Eugene A. Sands

BY

Pennie, Edmonds, Morton, Barrows & Taylor

ATTORNEYS

March 15, 1966 E. A. SANDS 3,240,999

ELECTRIC CIRCUIT CONSTRUCTION

Filed Oct. 8, 1962 2 Sheets-Sheet 2

INVENTOR
Eugene A. Sands
BY
Pennie, Edmonds, Morton, Barrows & Taylor
ATTORNEYS

United States Patent Office 3,240,999
Patented Mar. 15, 1966

3,240,999
ELECTRIC CIRCUIT CONSTRUCTION

Eugene A. Sands, Chappaqua, N.Y., assignor to Magnetics Research Company, Inc., White Plains, N.Y., a corporation of New York

Filed Oct. 8, 1962, Ser. No. 228,973
1 Claim. (Cl. 317—101)

This invention relates to the mounting and interconnection of electric circuit components, particularly of the miniature type, which are initially assembled together into "building blocks" or modules of uniform size. The invention provides a method and apparatus for mounting such modules and for effecting electrical connection thereof to each other and to other electrical circuits in a rapid, efficient and economical manner.

According to the invention, the building blocks are mounted, electrically and physically, upon an insulating wafer or board which is provided with apertures therethrough for reception of the leads from the building blocks. These leads, upon passage through such apertures, make electrical contact with conductor strips formed on the board. These conductor strips "fan out" or extend from the said apertures to end in a set of pads formed on the board, preferably in a standardized array, and holes through the board extend through each of these pads. A flexible, insulated wire is then threaded or "sewn" through these pads and extended to like pads of other leads for the same building block, and/or to the pads of other building blocks mounted on the same board in order to effect any desired interconnection of circuit components, and/or to the pads of conductor strips which lead to frictional or otherwise mechanically engageable and disengageable terminals which are provided on the board for connection to other like boards, or to cables or the like. To complete electrical connection between this wire and the strip conductors, soft solder may be employed, the insulation on the wire being of such a character that it melts off or otherwise disappears when locally heated for the purposes of soldering.

Figures 1, 5:
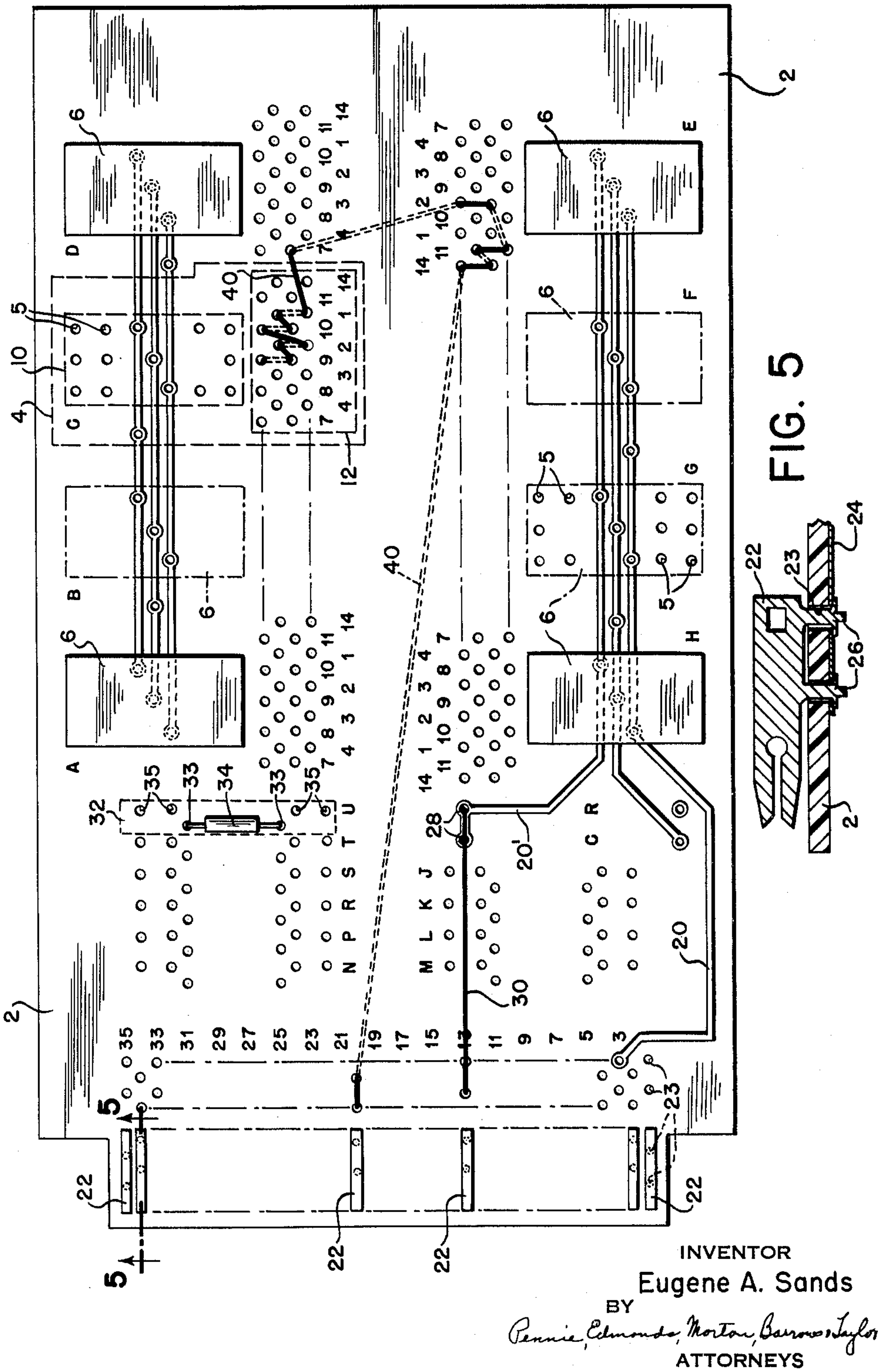
Figures 2, 3, 4:
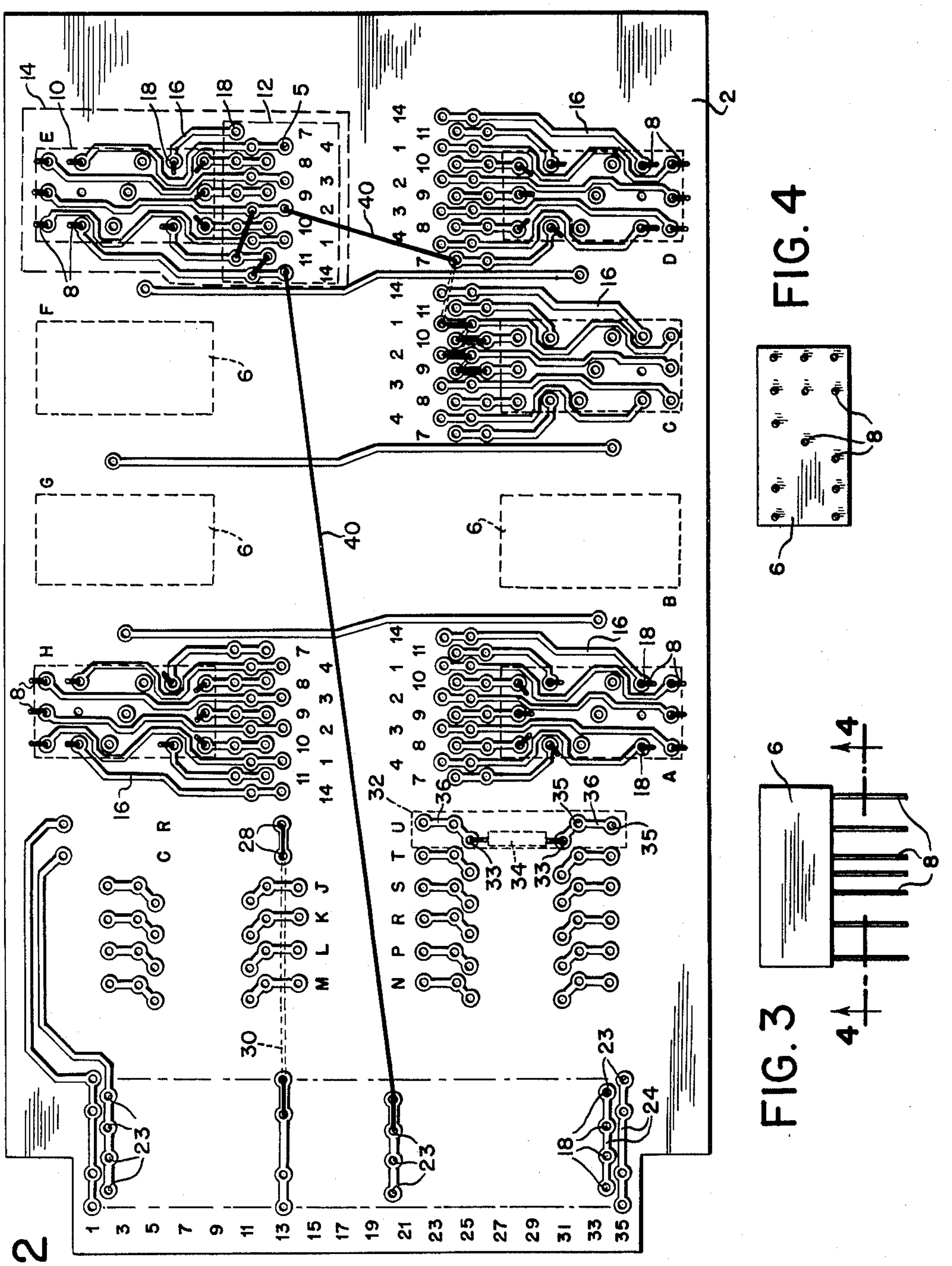

The invention will now be further described by reference to the accompanying drawings in which:

FIGS. 1 and 2 are plan views of the opposite sides of an electric circuit assembly according to the invention;

FIG. 3 is a view in side elevation of a building block subassembly of components as employed in the invention; and FIGS. 4 and 5 are sectional views taken on the lines 4—4 and 5—5 of FIGS. 3 and 1 respectively.

FIG. 1 is a plan view of the assembly of the invention. It comprises a board 2 of insulating material such as a phenolic resin, a plurality of sets of apertures 5, one such set being identified by the dashed line 4 enclosing it, and a plurality of "building blocks" or circuit element blocks 6 containing circuit elements such as transistors, diodes and the like. The board of FIGS. 1 and 2 includes provision for 8 blocks 6, at positions identified by the letters A through H, with blocks A, D, E and H being shown on the board.

One of the blocks 6 is seen in side elevation in FIG. 3. It has the shape of a cube or other rectangular parallelepiped, from the bottom of which project a plurality of electrical leads 8. These leads connect within the block to the electric circuit elements which are enclosed therein, in a manner which is not of significance to the present invention. Advantageously however, standardization is applied to the use of the leads, so that among plural blocks 6 having the same electrical component make-up, leads in corresponding positions will have the same electrical connections within the block. The leads from the blocks conform to a pattern, as indicated in the sectional view of FIG. 4.

On the board 2, each set 4 of holes 5 comprises two subsets. One subset conforms to the pattern of leads 8 seen in FIG. 4 and is indicated at the dash-line box 10 in FIG. 1. The other subset, indicated at the dash-line box 12, includes in the embodiment illustrated two holes for each hole of the subset 10. Index numbers may be applied to the pairs of holes in the subsets 12, as indicated in FIGS. 1 and 2.

For each block 6 to be accommodated thereon and hence for each set 4 of holes therethrough, the board or "card" 2 includes a set 14 of conductors 16 formed on and fixed to the board. The set 14 may include one conductor for each hole 5 in the subset 10. One such set of conductors is indicated at the dash-line box 14 in FIG. 2.

These fixed conductors 16 may be made up in a standardized pattern for each block, as indicated in FIG. 2, where the description of the pattern will be given with reference to position E, since a block 6 is shown at position E in FIG. 1. Each conductor 16 includes a pad 18 surrounding the hole 5 of subset 10 through which may be passed the lead 8 for which that conductor 16 is provided, and a pair of pads 18 surrounding each one of the two holes 5 in subset 12. The conductors 16 are advantageously provided on one face of the card such as that shown in FIG. 2 (hereinafter called the reverse face) which is opposite to the obverse face shown in FIG. 1 on which the blocks 6 are to be accommodated. One or more other conductors 20 may be provided on either or both faces of the card, providing for connection by means of pads 18 about holes 5 to particular leads for all of the blocks 6, in order to supply to them power and bias voltages. The conductors 20 may if desired extend to selected, standardized ones of the terminals 22 for the card (FIGS. 1 and 5).

More particularly, as seen in FIGS. 1 and 2, there is provided at one end of the card a set of four holes 23 for each one of a set of card terminals 22. The reverse face of the card includes a printed circuit conductor 24 for each set of holes 23, this conductor including pads 18 which surround each of the holes 23. The terminals 22 include legs 26 (FIG. 5) which extend through two of the holes 23 and which are crimped into contact with the corresponding one of conductors 24. The conductors 20 may extend on the observe face of the card either to holes 23 of selected ones of the terminals 22, or alternatively to additional holes 28, as indicated in FIG. 1 for the conductor 20′, from whence electrical contact may be extended by a "sewn" flexible conductor 30 to any desired electrical point on the card, including for example the holes 23 of a terminal 22. In case of the conductor 20 itself, electrical contact does not exist between that conductor, notwithstanding its extension to a hole 23, and the terminal 22 associated with that hole 23, until a flexible conductor is "sewn" through the card at that hole 23 in order to unite electrically the conductor 20 with the conductor 24 extending to that hole 23.

In general, each printed circuit conductor extends over one face of the card only, and the existence of such a conductor on both faces with pads at the same hole through the card does not interconnect those conductors until they are "sewn" together through that or some other hole or holes.

Other sets of holes may be provided, as indicated at the dash-line box 32 in FIG. 1. This set includes two adjacent holes 33 constituting a subset corresponding to the subset 10 for reception of the leads of a circuit component 34, and for each of the holes 33 a pair of nearby holes 35, with a fixed conducting strip 36 on the reverse face of the card extending from each hole 33 to its neighboring holes 35. A flexible conductor may be "sewn" through the two holes 35 of each such pair in order to connect the electrical end of component 34 at the adjacent hole 33 to any other electrical point on the card. The leads of component 34 are passed through the holes 33 and crimped into contact with conductors 36, and they may additionally soldered thereto.

In general, each electrical point on the card is defined by one, and preferably by two holes through the card, with a printed circuit conductor applied to one face of the card surrounding each of those two holes. Any such electrical point may be connected to any other electrical point by means of a flexible conductor as shown for example at 30, the conductor 30 being "sewn" through one and preferably through the two holes at each of the electrical points to be connected together. Electrical connection may then be made more certain and dependable between the flexible and printed circuit conductors by any suitable means such as soldering, the soldering process removing locally the insulation on the flexible conductors as already explained hereinabove.

Two holes are desirably provided for each electrical point in order that, if desired, the end or even an intermediate portion of a flexible interconnecting conductor may be readily mechanically locked at any such electrical point by means of a loop through the two holes. The strip-like or other conductor fixed on the board to which optional connection is to be made at those two holes should at a minimum extend between those two holes on one face of the board so that a flexible conductor "sewn" or looped through these two holes will pass directly over that fixed conductor in mechanical contact therewith.

According to the invention, the desired electric circuit elements such as blocks 6 and components 34 are first mechanically mounted on the board by passage of their leads through the board from the obverse face of FIG. 1 to the reverse face of FIG. 2, the leads being cut off and crimped over. As so crimped over they make mechanical and electrical contact with the fixed conductors which extend to and surround on the face of FIG. 2 the apertures through which those leads have been taken. Further and improved electrical contact of these leads to the fixed conductors may thereafter be made by soldering.

The circuit elements so mounted on the board are then interconnected according to the desired "logic" of the complete circuit to be created by sewing a flexible conductor among appropriate pairs of apertures such as the apertures of the subsets 12 and the apertures 35 and 23. The flexible conductor so "sewn" is pulled taut to lie flat against the board. Obviously plural separate circuits may be set up on the board by means of plural separate flexible conductors.

By way of example, there is shown in FIGS. 1 and 2 a flexible conductor 40 interconnecting module terminals 9, 2, 10 and 1 at module position C with module terminals 2, 11 and 14 at module position E and with the board terminal 22 bearing the index number 20. The conductor 40 is shown in each of FIGS. 1 and 2 in full lines at the portions thereof which lie on the side of the board presented to the reader in such figure, and in dashed lines at the portions thereof which are on the remote side of the board. In general, each circuit formed on the assembly of FIGS. 1 and 2 by the interconnection of circuit elements by means of a "sewn" flexible conductor will connect to at least one of the board terminals 22. In practice, a large number of such circuits may be provided, only one being shown in the drawings for the sake of clarity. Electrical interconnection may then be completed by means of a soldering operation at each point where the flexible conductor is to contact a fixed conductor and hence the circuit element which connects to that fixed conductor. All pre-cutting and stripping of flexible interconnecting wires is eliminated.

While the invention has been described herein in terms of a preferred embodiment, variations on and departures from this preferred embodiment may be made within the scope of the invention, which is rather set forth in the appended claims, as construed in the light of this descriptive specification.

I claim:

An electrical circuit construction for mounting and connecting a plurality of circuit components in a predetermined circuit arrangement comprising:

(a) an insulating board having a first and second side separated by a substantial thickness of insulating material;

(b) a plurality of sets of apertures in said board, the apertures of each set arranged in a predetermined array to match and receive the terminal leads of components to be connected therein;

(c) a conductive strip embedded in the first side of said insulating board for each aperture of said array and having one end of said strip encircling said aperture and leading away a substantial distance therefrom;

(d) a pair of apertures in close proximity to each other penetrating said insulating board and the other ends of said conductive strips providing terminal connecting means for each of said strips;

(e) an insulated wire for connecting said conductive strips according to the predetermined circuit arrangement, said wire being sewn through said insulating board at said pair of apertures passing from the second side of said board through one of said pair of apertures to the first side of said board, over and in contact with the upper surface of said strip and from said first side of said board through the other of said pair of apertures to the second side of said board and parallel to said second side of said board to the other strips to be connected in the same manner; and (f) means for connecting said wire electrically to said terminal strips at points between said pair of apertures.

References Cited by the Examiner

UNITED STATES PATENTS

| | | | |
|---|---|---|---|
| 1,142,393 | 6/1915 | Bloomer | 317—101 |
| 2,907,926 | 10/1959 | Slack | 317—101 |
| 2,967,979 | 1/1961 | Plesser et al. | 317—101 |
| 2,978,800 | 4/1961 | Blain | 317—101 |
| 2,984,697 | 5/1961 | Bontecue et al. | 339—17 |

KATHLEEN H. CLAFFY, *Primary Examiner.*

JOHN F. BURNS, *Examiner.*